United States Patent [19]

Genzling

[11] 4,089,236
[45] May 16, 1978

[54] SAFETY CONNECTION BETWEEN BICYCLE PEDAL AND SHOE

[76] Inventor: Claude Genzling, 15 avenue des Cedres, 92410 Ville d'Avray, France

[21] Appl. No.: 685,633

[22] Filed: May 12, 1976

[30] Foreign Application Priority Data

May 13, 1975 France .................. 75 14835

[51] Int. Cl.² .................. G05G 1/14; B62M 3/08
[52] U.S. Cl. .................. 74/594.4; 74/560; 280/611
[58] Field of Search .......... 74/594.4, 594.5, 594.6, 74/560, 563; 280/613, 624, 625, 636, 618, 626, 633, 637

[56] References Cited

U.S. PATENT DOCUMENTS

| 562,858 | 6/1896 | Sherman | 74/594.6 |
| 3,329,438 | 7/1967 | Lusser | 280/625 |
| 3,380,750 | 4/1968 | Salomon | 280/625 |

FOREIGN PATENT DOCUMENTS

| 16,890 of | 1906 | United Kingdom | 74/594.6 |
| 17,911 of | 1901 | United Kingdom | 74/594.6 |
| 1,396,393 | 6/1975 | United Kingdom | 74/594.6 |

Primary Examiner—Samuel Scott
Assistant Examiner—Don E. Ferrell
Attorney, Agent, or Firm—Steinberg & Blake

[57] ABSTRACT

A safety structure for automatically releasing a shoe worn by a cyclist from a bicycle pedal in the event of a collision, a fall, or the like. A structure which connects the shoe, worn by the cyclist during operation of the bicycle, to the pedal is supported by the pedal for movement automatically to a position releasing the shoe from the pedal whenever the cyclist exerts through the shoe on the pedal an abnormal force of the type which occurs during a collision, a fall, or the like.

15 Claims, 4 Drawing Figures

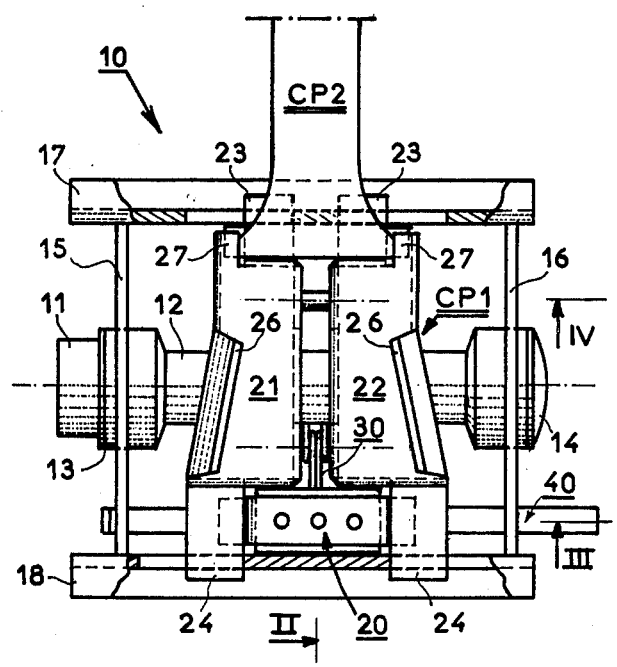
Fig. 1
Fig. 2
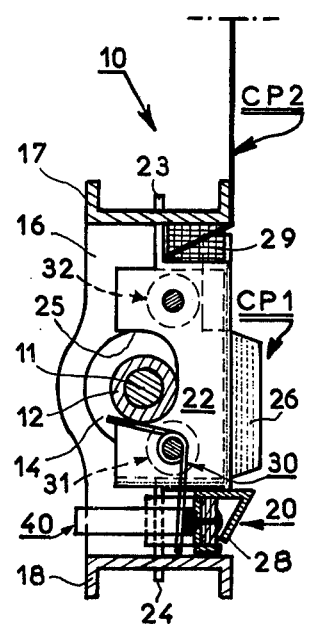
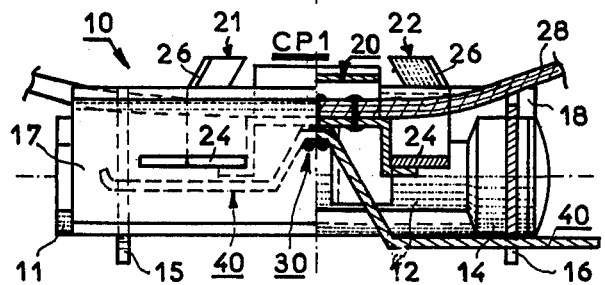
Fig. 3
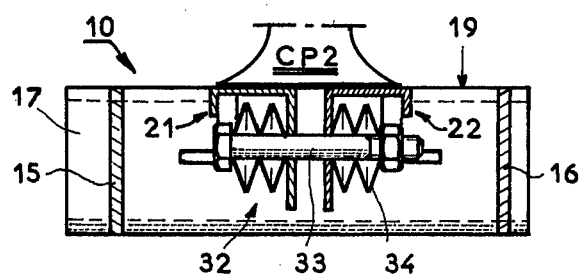
Fig. 4

SAFETY CONNECTION BETWEEN BICYCLE PEDAL AND SHOE

BACKGROUND OF THE INVENTION

The present invention relates to bicycles.

In particular, the present invention relates to a safety structure for connecting to a bicycle pedal a shoe, which is worn by the cyclist during operation of the bicycle, in such a way that the shoe will be automatically released from the pedal in response to an abnormal occurrence such as a collision, a fall, or the like.

Thus, while the invention relates in general to bicycle equipment, it is concerned particularly with safety devices utilized primarily by sport cyclists to maintain their shoes on the pedals in the best possible position for achieving the most effective use of the force exerted by the cyclist.

Known devices for connecting the shoes of a cyclist to the pedals include at least bands which are adapted to extend around the front parts of the shoes. However, racers, long-distance cyclists, or other sport cyclists also utilize a sole plate for connecting the shoe to the pedal. The bands referred to above include an elastic band adapted to extend forwardly around the front tip of the shoe and to be connected with a front part of the pedal as well as a rear band adapted to extend laterally around the shoe to the rear of the tip thereof, over the instep, this rear band generally including a buckle for tightening this rear band onto the shoe, and of course this rear band also is connected with the pedal. This rear band can be connected to the rear part of the band which extends forwardly around the front tip of the shoe and can extend around and beneath the pedal itself. The sole plate is in the form of a plate of suitable configuration fixed to the lower surface of the sole of the shoe, this sole plate generally having a configuration according to which it can be received in grooves or the like of a member fixed to the pedal and determining the position of the shoe on the pedal, the fixing of the shoe to the pedal being assured by the tightening of the band which extends around the upper part of the shoe over the instep thereof.

Devices of the above type are of course perfectly suitable in connection with application of propulsion forces by the cyclist to the bicycle, these propulsion forces acting generally in a vertical plane and being in the form of pushing as well as pulling forces. However, these known devices are inconvenient to manipulate and can be uncomfortable when used, particularly when the buckle of the band which passes lateraly around the shoe is not properly situated, the security of the connection of the shoe to the pedal depending upon the tightening of the lateral band around the shoe with the cyclist tending to provide excessive tightening of this band.

Moreover, fastening devices of the above type are difficult to manipulate for the purpose of quickly freeing the shoe from the pedal when it is desired to apply the shoe on the surface on which the bicycle travels, when it is desired to stop the bicycle or with a view to correcting a condition of lack of equilibrium, the cyclist risking a fall under these conditions. Moreover, and of even greater importance, fastening devices of the above type are dangerous in the case of unavoidable falls resulting, for example, from collisions with fixed objects or other cyclists, as, for example, when traveling at high speed down an incline along a sharply curved path or when traveling at high speed at a beginning of a race, for example, in a group of cyclists who are located extremely close to each other. The reason for the particular danger under these latter conditions resides in the fact that the cyclist is in effect connected to the bicycle, and his lower extremities can under the above conditions be submitted to abnormal forces in an attempt to pull away from the bicycle, with bending or twisting of the limbs under these conditions resulting undesirably in fractures or other serious injuries.

The fear of such a fall and the consequences thereof moreover result for most cyclists, under these conditions, in a limiting of their efforts and a holding back of their output so that as a result their performance is not as great as might otherwise be possible.

SUMMARY OF THE INVENTION

It is accordingly a primary object of the present invention to avoid the above drawbacks of the known fastening structures for connecting the shoes of the cyclist to the pedals.

In particular, it is an object of the present invention to provide for connection of the shoes to the pedals in such a way that safety of the cyclist is assured under all circumstances.

Also it is an object of the invention to provide devices of the above type which are convenient to use in a comfortable manner.

Yet another object of the present invention is to provide a construction which will not only assure automatic release of the cyclist from the bicycle under conditions where accidents and injuries would otherwise occur, but which also enables the cyclist very conveniently to connect his shoes to and disconnect them from the bicycle when the cyclist mounts and dismounts the bicycle.

Moreover, it is an object of the present invention to provide a safe connection to the bicycle in such a way that it is possible at the same time to assure the best possible operation of the bicycle. With the structure of the invention it is possible to connect not only a sole plate to the pedal but also to connect the upper forward part of the shoe to the pedal by way of suitable bands. According to the invention the pedal has a device for releasably connecting the sole plate and/or the bands to the pedal by way of a connecting means which is movable between holding and release positions and which normally remains in the holding position, during exertion of normal operating forces on the pedal, while including a force-responsive means which automatically responds to exertion of abnormal forces to bring about the displacement of the connecting means to its release position in a fully automatic manner which assures instant and total release of the connection between the pedal and shoe.

According to a preferred construction of the invention, the device includes a pair of transversely movable symmetrical jaws capable of moving freely in a transverse direction with respect to the pedal while having connected thereto a force-responsive means in the form of a suitable spring structure which normally maintains the connecting means in its normal or holding position but which can respond to abnormal forces to provide for displacement of the jaws to their release position. These jaws are adapted to cooperate with a sole plate while at their extremities they include structures for releasably connecting to the pedal the bands which extend around the upper front part of the shoe, the connection being such that in response to abnormal forces exerted by the cyclist on the pedal through the shoe the jaws are displaced to bring about release of the sole plate from the pedal and also an automatic disconnection from the pedal of the bands which extend around the upper front part of the shoe.

For this purpose the jaws define between themselves a space which is of a dovetail configuration which tapers forwardly and which also is of a dovetail configuration which tapers upwardly, the arrangement being such that any abnormal sliding force or pulling or twisting force will bring about spreading apart of the movable jaws so as to release the shoe automatically.

The structure of the invention is advantageously completed by way of a retractable lock means capable of snapping behind the sole plate and also connected with a band which extends around the upper part of the shoe, in such a way that the normal sliding of the shoe toward the front of the pedal, taking advantage of a guiding structure afforded by the configuration of the jaws, will enable the retractable lock structure automatically to snap by itself into the locking position to assure demobilization of the shoe on the pedal in the best possible position with respect thereto. At the same time, there is accessible to the cyclist a displacing means which can be operated by the cyclist to retract the lock means to its unlocking position freeing the sole plate and thus the shoe for release from the pedal by a simple movement of the shoe toward the rear, without by these latter operations in any way producing a spreading apart of the jaws or influencing the connection of the bands to the pedal.

The structure of the invention can be quite simple and economical, being made for the most part of sheet metal without undesirably adding to the weight of the bicycle and while at the same time avoiding all of the risks inherent in the previously known devices for fastening the shoes to the pedals.

BRIEF DESCRIPTION OF DRAWINGS

The invention is illustrated by way of example in the accompanying drawings which form part of this application and in which:

FIG. 1 is a partly sectional plan view of a bicycle pedal provided with the safety structure of the invention for fastening a shoe to the pedal;

FIG. 2 is a longitudinal sectional elevation taken along line II of FIG. 1 in the direction of the arrow;

FIG. 3 is a transverse partly sectional elevation taken along line III of FIG. 1 in the direction of the arrows; and FIG. 4 is a transverse sectional elevation taken along line IV of FIG. 1 in the direction of the arrow.

DESCRIPTION OF PREFERRED EMBODIMENTS

Referring now to FIG. 1, there is illustrated therein a pedal 10 which includes a preferred form of the structure of the present invention and which also has in a known way a transversely extending central shaft 11 capable of being threaded at its left end, as viewed in FIG. 1, onto the head of the rotary propelling crank of the bicycle. This shaft 11 extends through an elongated transversely extending sleeve 12 which is freely turnable on the shaft 11, this sleeve 12 being supported on the shaft 11 by way of a pair of ball bearings 13 and 14. The pedal 10 also includes a pair of opposed parallel, longitudinally extending bars 15 and 16 which are fixed to the sleeve 12 for free turning therewith about the shaft 11, these longitudinal opposed bars 15 and 16 being connected to the opposed ends of the sleeve 12 at the regions of the bearings 13 and 14. At their free ends, the parallel longitudinal bars 15 and 16 are fixed with front and rear transversely extending bars 17 and 18 which thus form with the bars 15 and 16 a rectangular or square frame for the pedal. It will be seen that the front and rear bars 17 and 18 are parallel to the shaft 11 and the sleeve 12. It will thus be seen that the above-described structure forms a rigid frame having an upper surface 19 (FIG. 4) against which the shoe of the cyclist is applied.

For the purposes of sport cycling, the pedal 10 is provided on the one hand at a central rear part with a connecting means CP1 for connecting a sole plate to the pedal and on the other hand both forwardly and rearwardly of the connecting means CP1 with a band means CP2 for the purpose of extending around the front portion of the shoe. The connecting means CP1 and the band means CP2 have a construction according to the invention and are connected to each other and to the pedal in accordance with the invention so as to achieve the safety advantages of the invention as well as the convenience referred to above.

The sole plate which is adapted to be connected with the connecting means CP1 is not illustrated but has the construction of a simple metallic plate connected at a suitable location to the bottom surface of the sole of the shoe of the cyclist, this sole plate, instead of having the usual transverse groove, having a substantially trapezoidal configuration provided with opposed oppositely inclined sides which converge forwardly, with the opposed side surfaces of the sole plate also converging toward each other in an upward direction, so that the sole plate has the configuration of a double dovetail in that it has a forwardly directed dovetail configuration as well as an upwardly directed dovetail configuration.

The connecting means CP1 for connecting the above sole plate, fixed to the shoe sole, to the pedal is situated in front of an extends rearwardly across opposed ends of a transversely extending lock means 20 capable of sliding vertically along the front surface of the rear transverse bar 18 which forms part of a support means for the pedal 10, as will be apparent from the description below. The connecting means CP1 is essentially formed by a pair of longitudinally extending jaws 21 and 22 which extend across the sleeve 12 and are capable of shifting laterally with respect thereto, toward and away from the side bars 15 and 16. The jaws 21 and 22 extend longitudinally between the front and rear bars 17 and 18. The movable components 20, 21, 22 are normally maintained at predetermined positions relative to each other by way of suitable elastic means and stops.

In greater detail, each movable jaw 21 and 22 is in the form of a longitudinally angled member made of suitable sheet metal. The jaws 21 and 22 terminate in front tongues 23 and in rear tongues 24, respectively. The front bar 17 as well as the rear bar 18, both of which form part of the support means of the pedal are formed with horizontally extending slots through which the tongues 23 and 24 extend so that in this way the jaws 21 and 22 are laterally slidable at their front and rear tongues on the slots. Thus, the support means formed by the frame structure 15–18 serves to support the jaws 21 and 22 of the connecting means CP1 for lateral movement respectively toward and away from the side bars 15 and 16.

The jaws 21 and 22 respectively have flat horizontal walls which extend forwardly and rearwardly over the sleeve 12. At their inner edges which are nearest to each other these flat horizontal walls of the jaws 21 and 22 are connected with downwardly extending vertical walls each of which is formed with a downwardly directed cutout 25, shown most clearly in FIG. 2, with the sleeve 12 extending through this cutout 25. It will be seen that the cutout 25 has in the longitudinal direction a length greater than the diameter of the sleeve 12 so that the jaws 21 and 22 not only can slide laterally along the axis of the sleeve 12 but also can shift forwardly and rearwardly with respect to the sleeve 12, thus facilitating assembly of the jaws with the support means 15–18 and freeing the jaws for movement with respect to the support means and the sleeve 12. At their outer edges which are most distant from each other, the upper horizontal walls of the jaws 21 and 22 are connected with the elongated jaw portions 26 which not only are inclined so as to converge toward each other in a forward direction but also which are inclined so as to converge toward each other in an upward direction. Thus, these jaw portions 26 define between themselves a space of double dovetail configuration in that the space has a dovetail configuration in a forward direction as well as in an upward direction, and of course these jaws 26 are adapted to engage the inclined side surfaces of the sole plate which has been referred to above and which is not illustrated. The front regions of the jaws 21 and 22 are provided at their upper walls with forwardly extending portions 27 of substantially square configuration as shown most clearly in FIG. 1.

It is apparent, therefore, that the jaws 21 and 22, particularly by way of the inclined portions 26 thereof, have a configuration which will assure maintaining the sole plate connected with the pedal. As is apparent most clearly from FIG. 2, the lock means 20 is adapted to be situated behind the sole plate once the latter has been moved forwardly to a predetermined position over the sleeve 12 and the shaft 11 between the oppositely inclined portions 26 of the jaws 21 and 22. The band means CP2 includes a band 28 which is fixed, as by riveting, to a portion of the vertically movable lock means 20, the lower part of the band 28 being shown partly in section in FIG. 3. This band 28 is adapted to extend around the upper part of the shoe over the instep of the foot. At its upper portion, which is not illustrated, the band 28 passes, for example, through a loop of a second band which extends forwardly from the band 28 over the toe portion of the shoe and around the front thereof to extend beneath the front tip of the shoe and be connected to a member 29 which at its opposed ends is situated beneath the forward portions 27 of the jaws 21 and 22 when the latter are in their normal position illustrated in the drawings. The front lower portion of this latter band which is connected to the member 29 is illustrated in FIGS. 1 and 2 where it extends from the member 29 over the upper surface portion of the front transverse bar 17 of the pedal 10, and part of this latter band is also indicated fragmentarily in FIG. 4. The lock means 20 is urged upwardly by a spring means in the manner described in greater detail below. This lock means 20 is in the form of an elongated angled metal member having a lower wall situated between a pair of upwardly extending walls, as shown most clearly in FIG. 2, the rear upwardly extending wall extending along the inner front surface of the rear bar 18 while the front upwardly extending wall of the lock means 20 is situated directly behind the upper flat wall portions of the jaws 21 and 22 which are joined to the inclined portions 26 and which directly engage the lower surface of the sole plate. The rear edges of these horizontal flat portions of the jaws 21 and 22 are joined with downwardly extending portions thereof which extend downwardly along the front vertical wall of the lock means 20, and at their lower ends these downwardly extending portions of the jaws 21 and 22 are joined with the rearwardly extending tongues 24 which extend through horizontal slits in the rear bar 18, as described above. These tongues 24 in turn extend over opposed end portions of the lock means 20. Thus, as is shown most clearly in FIG. 3, the lower horizontal wall of the lock means, to which the band 28 is riveted, is joined at its opposed ends to a pair of downwardly extending wall portions which in turn are joined to opposed horizontally extending wall portions which are situated directly beneath the rear tongues 24 of the jaws 21 and 22, so that in the normal position of these jaws illustrated in the drawings, the upward movement of the lock means 20 is limited by the rear tongues 24 of the jaws 21 and 22. As is also shown most clearly in FIG. 2, the front upwardly extending wall of the lock means 20 is joined at its upper edge to a downwardly and rearwardly inclined wall portion forming a ramp which is engaged by the sole plate of the shoe as the latter is moved forward into the space between the oppositely inclined portions 26 of the jaws 21 and 22, and the spring which urges the lock means 20 up into engagement with the tongues 24 yields during movement of the sole plate into the space between the portions 26 of the jaws 21 and 22, to permit the lock means to be displaced downwardly by the sole plate of the shoe until the sole plate is properly situated in the predetermined position between the portions 26 of the jaws whereupon the lock means 20 snaps up to the position shown in FIG. 2 to be situated behind the rear edge of the sole plate.

Thus, the front portions 27 of the jaws serve to hold the member 29 of the band CP2 assembled with the pedal while the jaws 21 and 22 are in their normal position illustrated in the drawings, and it will be seen that this member 29 is situated at its opposed ends beneath the portions 27 of the jaws and at the same time rests on the front tongues 23 of the jaws which respectively extend through the horizontal slits formed in the front bar 17 of the pedal 10. Thus, vertical movement of the member 29 is prevented in an upward direction by the portions 27 of the jaws and in a downward direction by the tongues 23. Forward and rearward movement of the member 29 is prevented by the bar 17 and the downwardly extending wall portion of the jaws 21 and 22 which extend downwardly from the front edges of the horizontal wall portions thereof which directly engage the lower surface of the sole plate, these downwardly extending front wall portions of course being joined at their lower edges to the forwardly extending tongues 23 which extend beneath the member 29 and through the slits in the bar 17. The band of the band means CP2 which extends forwardly from the member 29 and then upwardly around the front tip of the shoe may be made of an elastic material of a suitable plastic, for example.

The various movable components described above are normally maintained in their illustrated positions with respect to each other by way of spring means and stop means which are associated with these movable components. Thus, the vertically movable lock means 20 is maintained in its upper position engaging the rearwardly extending tongues 24 by way of a spring means which includes the spring 30 mounted on and cooperating with other elements as referred to in greater detail below. In this way, as is clearly shown in FIG. 2, the downwardly and rearwardly inclined upper wall of the lock mean 20 forms a rearwardly directed inclined ramp surface assuring retraction of the lock means upon insertion of the sole plate into the space between the upper portions 26 of the jaws 21 and 22 of the connecting means CP1, as described above.

The connecting means CP1 is maintained in its normal holding position shown in the drawings by a force-responsive means which acts on the connecting means to maintain it in its normal position as long as the cyclist exerts only normal forces on the jaws 21 and 22 during normal operation of the bicycle. This force-responsive means is capable of responding, however, to abnormal forces exerted by the cyclist through the shoe on the jaws 21 and 22 to provide for displacement of the latter by the shoe to a release position which will release the shoe as well as the band means CP2, so that both the band means and the shoe can instantly and totally be separated from the pedal 10. It will be seen that the front tongues 23 of the jaws 21 and 22 respectively extend through a pair of horizontal slots in the front bar 17, these horizontal slots having inner ends nearest to each other and forming stops for limiting the movement of the jaws 21 and 22 toward each other. In the same way, as is shown most clearly in FIG. 1, the horizontal slots in the rear bar 18 which receive the tongues 24 have inner ends which are nearest to each other and which form stops limiting also the movement of the jaws 21 and 22 toward each other. The above force-responsive means includes a rear spring means 31 and a front spring means 32 both of which act on the jaws 21 and 22 for maintaining them in their normal positions illustrated in the drawings, with the spring means 31 and 32 yielding in response to abnormal forces so that when such abnormal forces are provided through the shoe on the jaws 21 and 22 these jaws will be capable of moving apart from each other while the spring means 31 and 32 yield to such abnormal forces. The front spring means 32 is situated between the sleeve 12 and the front bar 17 while the rear spring means 31 is situated between the rear bar 18 and the sleeve 12. The spring means 32 is shown in detail in FIG. 4, and it will be understood that the spring means 31 is of the same construction. Thus, as is apparent from FIG. 4, each of the spring means 31 and 32 includes a horizontal bolt 33 having a left head end, as viewed in FIG. 4, and carrying a nut at its right threaded portion, as is also indicated in FIG. 4. The bolt 33 of each spring means extends freely through a pair of aligned openings formed at the inner downwardly extending wall portions of the jaws 21 and 22. Between the head of the bolt 33 and the downwardly extending inner wall of the jaw 21 are a series of Belleville spring washers 34, and a second series of these dished springy washers 34 are situated between the nut on the bolt 33 and the inward downwardly extending wall of the jaw 22, as shown in FIG. 4. Of course, any other type of spring structure could be used such as suitable coil springs. Thus, the spring structure 34 serves to urge the jaws 21 and 22 toward each other while the inner ends of the slots which guide the tongues 23 and 24 limit the movement of the jaws toward each other. Thus, the nut on the bolt 33 can be turned for adjusting the spring force, and the friction of the spring washers will of course assure that the adjusted spring force is maintained during operation.

As was indicated above, the lock means 20 is maintained yieldably in its upper position by the spring 30 which can very simply be formed, as shown in FIG. 2, by an elastic springy wire or pair of wires which at intermediate portions thereof are coiled around the bolt 33 of the rear spring means 31, these springy wires of the spring means 30 being situated between the pair of inner downwardly extending wall portions of the jaws 21 and 22. One end of the springy wires of the spring means 30 presses directly against the sleeve 12 while the other end extends beneath the lock means 20. Between the part of the spring means 30 which extends beneath the lock means 20 and the lock means is a displacing means 40 accessible to the operator for displacing the lock means 20 downwardly at the will of the operator. This displacing means 40 is in the form of an elongated bar having the configuration which is shown most clearly in FIG. 3. The left end of this bar 40, as viewed in FIG. 3, extends through an opening formed in the longitudinal bar 15 of the pedal so that the bar 40 can tilt with respect to the bar 15 which thus supports the bar 40 for turning movement. This bar 40 extends freely beneath the left lower portion of the lock means 20 and then upwardly over the spring means 30 to be situated between the latter and the lower surface of the lock means 20. Just to the right of the spring means 30, as viewed in FIG. 3, the bar 40 again extends downwardly, and then it extends horizontally through a notch which is formed in the right bar 16, this notch having an open bottom end, and of course the bar 40 has a free end extending outwardly beyond the bar 16, as illustrated in FIG. 3. Thus, the operator can readily engage the right free end of the bar 40, where it extends beyond the bar 16, to push downwardly on the bar 40 so as to press the rear portion of the spring 30 downwardly, and in this way the lock means 20 is released for downward movement, the lock means 20 simply resting on the bar 40 and following the downward movement thereof due to the weight of the lock means 20 which is freely movably in a vertical direction between the bar 18 and the rear downwardly extending wall portions of the jaws 21 and 22. Thus whenever the cyclist wishes to disengage a shoe from the pedal it is only required to depress the free end of the bar 40.

The above-described structure operates and is utilized in the following manner:

Both when the structure is used as well as when it is at rest, the various movable components have with respect to each other the positions shown in the drawings. The nuts threaded onto the bolts 33 have of course previously been placed in positions on the bolts according to which the force-responsive means formed by the spring means 31 and 32 will act with a predetermined force on the jaws 21 and 22.

When the cyclist mounts the bicycle, he very simply slips the sole plate into the space between the portions 26 of the connecting means CP1, with the front portion of the shoe simply sliding beneath the front and lateral bands of the band means CP2. This operation is very greatly facilitated because of the guiding function performed by the upper portions 26 of the jaws 21 and 22. Also, the retraction of the lock means 20 downwardly by sliding of the sole plate over the upper ramp surface of the lock means as described above facilitates the joining of the shoe to the pedal, the lock means 20 snapping up behind the sole plate when the latter reaches a predetermined position with respect to the pedal, as pointed out above. In this way the shoe is connected with the pedal in the best possible position with respect thereto, and of course the lock means 20 will maintain the shoe connected with the pedal during the normal operations. Once the shoe is thus connected by way of the connecting means CP1 with the pedal, it only remains for the operator to tighten the band 28, and this tightening can be relatively moderate inasmuch as it has nothing to do with maintenance of the connection between the sole plate and the pedal. Moreover, if desired, the band 28 can take the form of a simple endless elastic band capable of expanding and contracting so that it becomes possible in this way to eliminate entirely the tightening operation and avoid the discomfort which otherwise would be created by a conventional buckle.

Thus, with the structure of the invention it is only necessary to join the shoe to the pedal by operations to which the cyclist is accustomed, since no special operations are required by the safety structure of the invention in connection with joining the shoe to the pedal. The shoe will remain reliably connected with the pedal as long as the cyclist exerts only normal forces of propulsion. These forces involve either downward and forward pushing or an upward pulling combined with a forward push, with respect to the pedal 10 which can very easily pivot at its sleeve 12 which is capable of oscillating with respect to the crank during each rotation thereof. The slight push toward the rear can be carried out during only a relatively short part of each revolution just beyond the bottom dead center point of each revolution, and this rearward push is easily transmitted by way of the lock means 20 through the pedal to the crank, while the jaws 21 and 22 provide by way of their upper portions 26 an effective transmission of forwardly directed pushing forces and upward pulling.

On the other hand, all abnormal forces exerted by the operator will bring about a lateral displacement of at least one of the jaws 21 and 22 and as a result an instant and total release of the connection between the shoe and pedal.

Thus, if there is a forward push or upward pull of greater than normal intensity, then, because of the inclination of the upper portions 26 of the jaws 21 and 22 and because of the force exerted by the spring means 31 and 32, the spring means 31 and 32 will yield to permit the jaws 21 and 22 to move apart from each other, thus releasing the sole plate as well as the band means CP2, the rear band 28 being released from the pedal together with the lock means 20. At the same time, any unusual lateral force exerted by the operator through the shoe on the pedal in one direction or the other will result in lateral displacement of one or the other of the jaws 21 and 22, while any unusual twisting forces provided by the operator through the shoe on the pedal will result in lateral swinging of one or the other of the jaws 21 and 22. It is to be noted in this latter connection that these latter types of forces, namely an unusual lateral force in one direction or the other or a twisting force are required only to overcome a considerably diminished force of the force-responsive means provided by way of the spring means 31 and 32 inasmuch as the springy flexing of the several springy washers 34 results in the forces of the washers being added to each other but not the opposite. Moreover, in the case of lateral twisting forces only one of the spring means 31 and 32 will act. Thus, by properly choosing the forces exerted by the spring means 31 and 32 and by properly choosing the angles of inclination of the portions 26 of the jaws, the release of the connection can be achieved with abnormal forces of different intensities depending upon the particular direction of these forces and the nature thereof, in proportion to the manner in which the various components oppose the forces exerted by the cyclist.

It is thus apparent that the safety connecting structure of the invention not only is more convenient and comfortable to utilize than previously known safety bindings, but in addition the structure of the invention eliminates the most serious risks inherent in a fall, to the extent that a cyclist is immediately and automatically separated from the bicycle and as a consequence is placed in a much better position to break his own fall.

Moreover, one of the important advantages achieved with the structure of the invention resides in the capability of releasing the connection of the shoe to the pedal by way of the lever 40, and this latter capability in itself contributes toward preventing falls if only because it frees the cyclist from all fear of falls. In this latter connection, it is to be noted that it would be relatively easy to provide the possibility of holding the lock means 20 permanently in an inoperative position by cutting a suitable bayonet notch or the like in the bar 16.

Of course, as soon as one or both of the jaws 21 and 22 are moved outwardly away from the inner ends of the slots of the bars 17 and 18 which receive the tongues 23 and 24 through a relatively short distance, one or both of the parts 27 of the jaws will move beyond the member 29 to release the front of the band means CP2, while one or both of the tongues 24 will move laterally beyond one or the other of the lower ends of the lock means 20 to release the latter together with the band 28 for separation from the pedal, and of course the sole plate is also automatically capable of moving freely out of the space between the portions 26 of the jaws under these conditions.

Of course, the parts can readily be reassembled simply by situating the tongues 23 and 24 in their guide slots and by pulling one or the other of the jaws away from the other so as to introduce the member 29 and the lock means 20 back to the operative positions thereof shown in the drawings.

Of course, the invention is not necessarily limited to the particular details described above and shown in the drawings. On the contrary, all technical equivalents of the above features of the invention are to be considered as included therein. For example, a pair of pivoted components can be used to replace the laterally slidable components 21 and 22 which have the inclined portions 26. The series of Belleville spring washers 34 can of course be advantageously replaced by other elastic structures. For example in this latter connection it is possible to use an over-center type of spring structure which upon passing its dead-center condition in response to exertion of a force of a given magnitude will snap over to its other position providing in this way a positive separation of the sole plate and band means from the pedal. Moreover, the lever 40 can be replaced by a device which can be pushed, such as a push-button type of release device or a releasably catch type of device, having a double detent and situated so that it can conveniently be actuated directly by engagement with the shoe of the cyclist. Such variations as well as all others which can be envisaged are of course considered to be included within the scope of the claims which follow.

What is claimed is:

1. In a bicycle, a pedal having a transverse shaft adapted to be connected at one end to a rotary propelling crank of the bicycle, and said pedal also having a support means carried by and freely turnable on said shaft, connecting means situated at least in part over said shaft for connecting to the pedal a shoe worn by a cyclist during operation of the bicycle, said support means supporting said connecting means for movement with respect to the pedal between a holding position holding the shoe connected to the pedal and a release position releasing the shoe from the pedal, and force-responsive means acting on said connecting means for maintaining the latter in said holding position thereof while the cyclist acts with normal forces through the shoe on the pedal during normal operation of the bicycle, said force-responsive means responding automatically to abnormal forces exerted by the cyclist through the shoe on the pedal for providing for displacement of said connecting means to said release position by the shoe, said connecting means including a pair of jaws extending over said shaft and adapted to engage opposite sides of the sole plate, said support means supporting said jaws for movement independently of each other laterally of the pedal toward and away from each other, and said force-responsive means including a spring means operatively connected with said jaws for urging them toward each other with a predetermined force.

2. The combination of claim 1 and wherein said jaws define between themselves a space which is of a dovetail configuration and which tapers in a forward direction.

3. The combination of claim 2 and wherein said jaws also define between themselves a space which is of a dovetail configuration tapering in an upward direction.

4. The combination of claim 1 and wherein a band means which is adapted to extend over the front portion of the shoe is situated at least in part beneath and slidably engaging at least one of said jaws to be connected by said connecting means to the pedal while said connecting means is in said holding position thereof, said connecting means when displaced to said release position thereof displacing a jaw situated over part of said band means to a location situated laterally of said part of said band means for releasing the connection of the band means to the pedal so that the band means can be separated from the pedal together with the shoe.

5. The combination of claim 1 and wherein said connecting means has at said jaws thereof a configuration for receiving a sole plate of a shoe for connecting the shoe at said sole plate thereof to the pedal in response to forward movement of the sole plate along the pedal to a predetermined position with respect thereto, and releasable lock means carried by the pedal for snapping behind the sole plate for locking the latter at the connecting means to the pedal when the sole plate reaches said predetermined position with respect to said pedal.

6. The combination of claim 5 and wherein said releasable lock means includes a lock for snapping behind the sole plate and a spring urging said lock member upwardly, said lock member extending in part beneath one of said jaws and pressed thereagainst by the spring which acts on said lock member, so that when one of said jaws is displaced laterally away from the other in response to abnormal forces acting on said force-responsive means, one of said jaws is displaced laterally beyond said clock member to release the latter for movement away from the connecting means.

7. In a bicycle, a pedal having a support means, connecting means for connecting to the pedal a shoe worn by a cyclist during operation of the bicycle, said support means supporting said connecting means for movement with respect to the pedal between a holding position holding the shoe connected to the pedal and a release position releasing the shoe from the pedal, and force-responsive means acting on said connecting means for maintaining the latter in said holding position thereof while the cyclist acts with normal forces through the shoe on the pedal during normal operation of the bicycle, said force-responsive means responding automatically to abnormal forces exerted by the cyclist through the shoe on the pedal for providing for displacement of said connecting means to said release position by the shoe, said connecting means having a configuration for receiving a sole plate of a shoe for connecting the shoe at said sole plate thereof to the pedal in response to forward movement of the sole plate along the pedal to a predetermined position with respect thereto, releasable lock means carried by the pedal for snapping behind the sole plate for locking the latter at said connecting means to the pedal when the sole plate reaches said predetermined position with respect to the pedal, and displacing means carried by the pedal and operatively connected to said releasable lock means for displacing the latter to an unlocking position releasing the sole plate for removal from the connecting means, said displacing means being accessible to the cyclist for operation by the cyclist.

8. The combination of claim 7 and wherein said releasable lock means has an upper surface inclined downwardly toward the rear of the pedal to be engaged by the sole plate when the latter is introduced into the connecting means and responding to said engagement with the sole plate to be displaced by the sole plate at the unlocking position until the sole plate reaches said predetermined position whereupon said lock means snaps up to its locking position.

9. The combination of claim 7 and wherein said connecting means connects said releasable lock means to the pedal while said connecting means is in said holding position thereof, and said connecting means disconnecting said lock means from the pedal for release therefrom when said connecting means is displaced by an abnormal force to said release position thereof.

10. The combination of claim 9 and wherein said releasable lock means has connected thereto a band for extending around the shoe so that said band also will be disconnected from the pedal when abnormal force acts on the connecting means, said displacing means moving said releasable lock means to said unlocking position thereof without disturbing the assembly of the releasable lock means and the band connected thereto with the pedal.

11. The combination of claim 10 and wherein a second band is adapted to extend over the front part of a shoe and around a front tip thereof, and means connecting said second band to the pedal, the latter means being held by said connecting means assembled with the pedal only while said connecting means remains in said holding position thereof, said connecting means releasing said second band and means connecting the latter to the pedal from the pedal when said connecting means is displaced to said release position thereof in response to an abnormal force.

12. In a bicycle, a pedal having a support means, connecting means for connecting to the pedal a shoe worn by a cyclist during operation of the bicycle, said support means supporting said connecting means for movement with respect to the pedal between a holding position holding the shoe connected to the pedal and a release position releasing the shoe from the pedal, and force-responsive means acting on said connecting means for maintaining the latter in said holding position thereof while the cyclist acts with normal forces through the shoe on the pedal during normal operation of the bicycle, said force-responsive means responding automatically to abnormal forces exerted by the cyclist through the shoe on the pedal for providing for displacement of said connecting means to said release position by the shoe, said support means including front and rear pedal bars extending transversely across the pedal and each formed with a pair of horizontal slots, the pedal including opposed longitudinally extending bars extending between and connected to said front and rear bars to form a frame therewith, and said pedal having between said front and rear bars a sleeve extending between and connected to said longitudinal bars and adapted to be pivotally supported on a crank of the bicycle, said connecting means including a pair of elongated jaw members extending longitudinally of the pedal between said front and rear bars thereof and each having front and rear tongues respectively extending through said horizontal slots to be laterally slidable therein together with said jaws, said force-responsive means including a spring means operatively connected with said jaws for urging them toward each other, and said jaws having upper portions which converge toward each other in a forward direction to define between themselves a space of dovetail configuration, said upper portions also being inclined toward each other in an upward direction for defining also a space of dovetail configuration which tapers in an upward direction, and said jaws terminating at their upper ends at upper enges of said upper jaw portions adapted to be situated inwardly of opposed lower side edges of the pole plate, said pedal carrying behind said jaws a transversely extending lock member adapted to snap behind a sole plate when the latter has reached a predetermined position between said jaws, and said pedal carrying a spring means urging said lock member up to the elevation of said upper portions of said jaws for snapping behind the sole plate, said pedal carrying a displacing means for displacing said lock member downwardly to an unlocking position and said displacing means being accessible to the cyclist for operation by the cyclist.

13. The combination of claim 12 and wherein said jaws when in their holding position extend over portions of said lock member for holding the latter assembled with the pedal, and said jaws when displaced to their release position being displaced at least slightly beyond said lock member to release the latter for separation from the pedal.

14. The combination of claim 13 and wherein a band member which is adapted to extend around a front portion of the shoe is connected with said lock member.

15. The combination of claim 14 and wherein a second band member which is adapted to extend forwardly around a front tip of the shoe is connected at a front end with a front connecting element held by said jaws assembled with the pedal only while the jaws remain in their holding position, said jaws when is said release position thereof releasing said front element with said second band from the pedal.

* * * * *